US008577582B2

(12) United States Patent
Yu et al.

(10) Patent No.: US 8,577,582 B2
(45) Date of Patent: Nov. 5, 2013

(54) ISG ENTRY APPARATUS AND METHOD OF VEHICLE

(75) Inventors: Jiyong Yu, Pocheon-si (KR); Sejun Kim, Seoul (KR); Chongah Gwon, Hwaseong-si (KR); Sungjin Park, Gwangmyeong-si (KR); Junghwan Bang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 351 days.

(21) Appl. No.: 13/192,340

(22) Filed: Jul. 27, 2011

(65) Prior Publication Data

US 2012/0136557 A1 May 31, 2012

(30) Foreign Application Priority Data

Nov. 30, 2010 (KR) ........................ 10-2010-0120905

(51) Int. Cl.
*G06F 19/00* (2011.01)
*G06G 7/70* (2006.01)

(52) U.S. Cl.
USPC ......... 701/112; 701/102; 701/113; 123/179.4

(58) Field of Classification Search
USPC ......... 123/179.1, 179.3, 179.4; 701/102, 112, 701/113; 340/455
See application file for complete search history.

(56) References Cited

U.S. PATENT DOCUMENTS 6,445,982 B1 9/2002 Swales et al.
7,869,932 B2 * 1/2011 Boesch ......................... 701/112
8,181,619 B2 * 5/2012 Magarida et al. .......... 123/179.4
2011/0266865 A1 * 11/2011 Okabe et al. ................. 307/10.6
2012/0138006 A1 * 6/2012 Gwon et al. ............... 123/179.4
2012/0143481 A1 * 6/2012 Yu et al. ......................... 701/113

FOREIGN PATENT DOCUMENTS

| | | | |
|---|---|---|---|
| JP | 2003009311 | A | 1/2003 |
| JP | 2004137978 | A | 5/2004 |
| JP | 2009-13883 | A | 1/2009 |
| JP | 2010-223215 | A | 10/2010 |
| KR | 1020060034918 | A | 4/2006 |
| KR | 10-0634600 | B1 | 10/2006 |
| KR | 10-2009-0107359 | A | 10/2009 |
| KR | 1020100060160 | A | 6/2010 |

* cited by examiner

*Primary Examiner* — Stephen K Cronin
*Assistant Examiner* — Joseph Dallo
(74) *Attorney, Agent, or Firm* — Morgan, Lewis & Bockius LLP

(57) ABSTRACT

An ISG entry apparatus and method is capable of operating ISG logic without employing a battery sensor. The ISG entry apparatus includes a starting voltage detection unit detecting a starting voltage of an ISG vehicle having no battery sensor mounted therein, a cooling water detection unit detecting a cooling water temperature of the ISG vehicle, an ISG entry frequency detection unit detecting an ISG entry frequency of the ISG vehicle, an accumulated charge amount detection unit detecting an accumulated charge amount of the ISG vehicle during driving, a starting number counting unit counting the starting number of the ISG vehicle, and an engine control unit determining whether or not to enter a mode in which an ISG operation is performed based on the starting voltage, the cooling water temperature, the ISG entry frequency, the accumulated charge amount, and the starting number and performing an ISG operation.

8 Claims, 2 Drawing Sheets

ISG ENTRY APPARATUS AND METHOD OF VEHICLE

CROSS-REFERENCE TO RELATED APPLICATIONS

The present application claims priority to Korean Patent Application Number 10-2010-0120905 filed Nov. 30, 2010, the entire contents of which application is incorporated herein for all purposes by this reference.

BACKGROUND OF INVENTION

1. Field of Invention

The present invention relates to an idle stop & go (ISG) entry apparatus and method, and more particularly, to an ISG entry apparatus and method of an ISG vehicle which automatically stops an idling engine when the vehicle is stopped, and restarts the engine when the vehicle is to be started after a predetermined time.

2. Description of Related Art

Among a variety of gases composing the atmosphere, a gas causing a green-house effect is referred to as a green-house gas. The green-house gas may include carbon dioxide, methane, nitrous oxide, Freon gas, ozone and so on. Actually, vapour plays the largest role in causing a natural green-house effect. However, a representative example of the green-house gas causing global warming is carbon dioxide.

As global warming is accelerated from the second half of the 20th century, abnormal climate changes such as concentrated heavy rain, drought, and typhoon have rapidly increased. If the current pollution level is continuously maintained, it is expected that the worldwide green-house gas emission will approach such a level that seriously threatens the human beings and the ecosystem in the near future.

Accordingly, in order to deal with the global warming caused by the green-house gases, international cooperation for reducing the green-house gas emission is being promoted in many areas.

Currently, a variety of attempts are being made to reduce the green-house gas emission in the transportation field. For example, much research has been conducted on fuel economy improvement.

At this point in time, fuel economy improvement is becoming a hot topic, and an ISG system tends to be expanded and applied worldwide. The ISG system receives information on vehicle speed, engine rotation speed, cooling water temperature and so on and issues a command to stop its engine while the engine is idling. In other words, the ISG system automatically stops its idling engine when the vehicle is stopped during urban driving, for example, when the vehicle waits at a red light, and restarts the engine when the vehicle is to be started after a predetermined time. The ISG system may be referred to as an idle stop control system or the like. The ISG system may accomplish a fuel economy effect of about 5-15% in an actual fuel economy mode. A vehicle having such an ISG system mounted therein is referred to as an ISG vehicle.

In commercial vehicles such as a taxi, a battery sensor may be deactivated due to the battery-related repair, and thus the operation of ISG logic may be frequently turned off (prohibited).

In such a case, customer complaints may be caused by the frequent limitation of the ISG logic. Furthermore, the battery sensor for recognizing the battery state may not exhibit its function.

In other words, an essential condition of the ISG vehicle is battery monitoring. The ISG vehicle includes a battery sensor mounted therein to check the battery state.

Due to the characteristics of the battery sensor, however, when a battery is detached to repair or replace the battery, the vehicle should be parked for about four hours, and the battery sensor is then activated. Otherwise, the ISG logic is not operated. In particular, commercial vehicles such as a taxi need to be regularly repaired, and thus the battery sensor thereof is frequently deactivated. In such a case, the ISG logic is not operated without any signs, and thus complaints may be caused by users who use the ISG vehicle.

As such, although the ISG vehicle includes a battery sensor mounted therein, the battery sensor may be frequently deactivated. In this case, users' complaints are inevitably caused. Furthermore, in a case of low-price vehicles, an additional cost for the battery sensor may serve as a burden. Accordingly, the price competitiveness decreases.

The information disclosed in this Background of the Invention section is only for enhancement of understanding of the general background of the invention and should not be taken as an acknowledgement or any form of suggestion that this information forms the prior art already known to a person skilled in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an ISG entry apparatus and method of vehicle which is capable of operating ISG logic without employing a battery sensor.

Various aspects of the present invention provide an ISG entry apparatus including a starting voltage detection unit detecting a starting voltage of an ISG vehicle having no battery sensor mounted therein, a cooling water temperature detection unit detecting a cooling water temperature of the ISG vehicle, an ISG entry frequency detection unit detecting an ISG entry frequency of the ISG vehicle, an accumulated charge amount detection unit detecting an accumulated charge amount of the ISG vehicle during driving, a starting number counting unit counting the starting number of the ISG vehicle, and an engine control unit determining whether or not to enter a mode in which an ISG operation is performed based on the starting voltage, the cooling water temperature, the ISG entry frequency, the accumulated charge amount, and the starting number, and performing an ISG operation.

The engine control unit may store reference values which are to be compared with the starting voltage, the cooling water temperature, the ISG entry frequency, the accumulated charge amount, and the starting number, respectively.

The respective reference values may be updated.

The engine control unit may perform the ISG operation, when the starting voltage, the cooling water temperature, and the accumulated charge amount are larger than the corresponding reference values, respectively, and the ISG entry frequency and the starting number are smaller than the corresponding reference values, respectively.

Other aspects of the present invention provide an ISG entry method including detecting a starting voltage of an ISG vehicle having no battery sensor mounted therein, detecting a cooling water temperature of the ISG vehicle, detecting an ISG entry frequency of the ISG vehicle, detecting an accumulated charge amount of the ISG vehicle during driving, counting the starting number of the ISG vehicle, and determining whether or not to enter a mode in which an ISG operation is performed based on the starting voltage, the cooling water temperature, the ISG entry frequency, the accumulated charge amount, and the starting number and performing an ISG operation.

In the performing of the ISG operation, reference values which are to be compared with the starting voltage, the cooling water temperature, the ISG entry frequency, the accumulated charge amount, and the starting number, respectively, may be used to determine whether or not to perform the ISG operation, and the ISG operation may be performed according to the determination result.

The respective reference values may be updated.

In the performing of the ISG operation, when the starting voltage, the cooling water temperature, and the accumulated charge amount are larger than the corresponding reference values, and the ISG entry frequency and the starting number are smaller than the corresponding reference values, the ISG operation may be performed.

According to various aspects of the present invention, although a battery sensor is not mounted, ISG entry may be performed based on the starting voltage, the cooling water temperature, the ISG entry frequency, the accumulated charge amount, and the starting number. Therefore, it is possible to increase the merchantable quality related to the ISG system and the drivability.

Furthermore, according to various aspects of the present invention, since a battery sensor is not mounted, a cost reduction effect may be acquired, and the price competitiveness increases.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
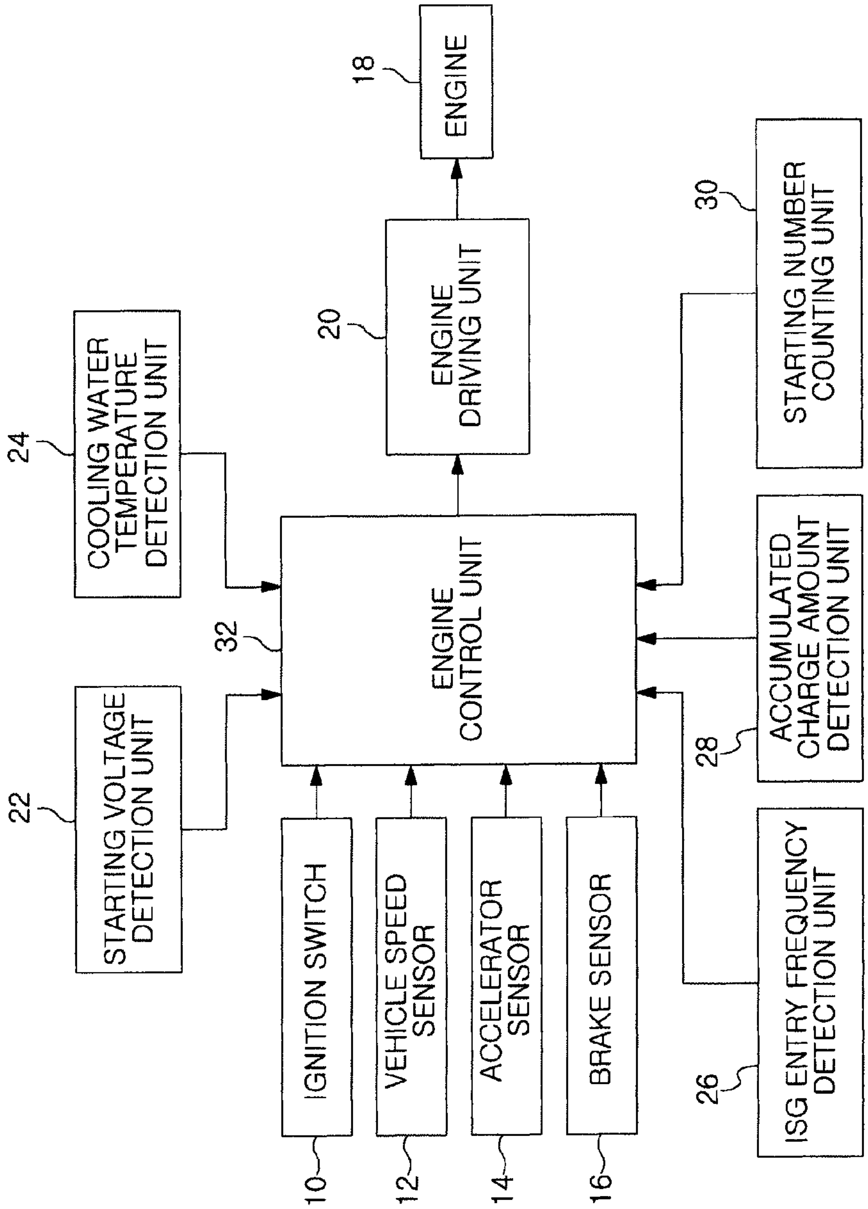
FIG. 1 is a block configuration diagram of an exemplary ISG entry apparatus according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

In the following descriptions of this specification, a vehicle refers to a vehicle having an ISG system mounted therein. For example, the vehicle includes a button positioned on an instrument panel at the front side of a driver's seat and configured to operate ISG logic. When the button is held down, the ISG logic is operated. Alternatively, when the vehicle is stopped, the ISG logic is automatically operated after a predetermined time, even though such a button is not provided. Furthermore, an ISG vehicle according to various embodiments is applied is set to a vehicle having no battery sensor mounted therein.

In FIG. 1, in order to automatically stop an engine 18 when the vehicle is stopped, for example, when the vehicle waits at a red light, the following conditions should be satisfied in a state in which an ignition switch 10 is turned on. That is, an output signal of a vehicle speed sensor 12 needs to indicate vehicle speed of "0(zero)", an output signal of an accelerator sensor 14 needs to indicate that an accelerator pedal is not stepped on, and an output signal of a brake sensor 16 needs to indicate that a brake pedal is being stepped on. Furthermore, the following precedent conditions need to be met the temperature of transmission oil falls within a predetermined range and the engine RPM is equal to or less than a predetermined value. Meanwhile, when a driver releases the brake pedal and steps on the accelerator pedal, stopped engine 18 is restarted.

In other words, an engine control unit 32 determines whether the engine is idling or not, based on the signals from ignition switch 10, vehicle speed sensor 12, accelerator sensor 14, and brake sensor 16, and then automatically stops or restarts engine 18. Such an automatic idle stop control method (typical ISG logic) will be easily understood by those skilled in the art.

FIG. 1 illustrates that ignition switch 19, vehicle speed sensor 12, accelerator sensor 14, and brake sensor 16 are used to determine whether engine 18 is idle or not. However, in order to simplify the drawing and for easy understanding, an idle sensor may be used to determine whether engine 18 is idle or not. The idle sensor serves to detect an idle state of engine 18, convert the detected idle state into an electrical signal, and output the electrical signal. The idle sensor includes an idle switch. The idle switch has an operation characteristic of being turned on when the vehicle is idling. Furthermore, the idle switch has an operation characteristic of being turned off when the stopped engine is restarted. When the idle switch is turned on, engine control unit 32 may determine that the vehicle is stopped in an idle state.

An engine driving unit 20 serves to drive engine 18 based on a control signal from engine control unit 32. Engine driving unit 20 includes an injector which injects fuel toward engine 18.

A starting voltage detection unit 22 serves to detect a starting voltage of an ISG vehicle having no battery sensor mounted therein, for example, an output voltage of a generator.

A cooling water temperature detection unit 24 serves to detect the cooling water temperature of engine 18 of the ISG vehicle having no battery sensor mounted therein. Cooling water temperature detection unit 24 measures a cooling state of the engine when the engine is initially started, and prevents incomplete combustion when the RPM increases during warming-up and thus the engine is cold worked. During hot working (a state in which the engine is sufficiently warmed up), information on flame ignition, a fuel injection time and so on may be delivered to engine control unit 32, according to the temperature of the engine.

An ISG entry frequency detection unit 26 serves to detect an ISG entry frequency of the ISG vehicle having no battery sensor mounted therein.

An accumulated charge amount detection unit 28 serves to detect an accumulated charge amount of the ISG vehicle having no battery sensor mounted therein during driving.

A starting number counting unit 30 serves to count the key starting number of the ISG vehicle having no battery sensor mounted therein.

Engine control unit 32 performs an ISG operation, based on the starting voltage from starting voltage detection unit 22, the cooling water temperature from cooling water temperature detection unit 24, the ISG entry frequency from ISG entry frequency detection unit 26, the accumulated charge amount from accumulated charge amount detection unit 28, and the starting number from starting number counting unit 30. Engine control unit 32 stores a reference value (first reference value) which is to be compared with the inputted starting voltage, a reference value (second reference) value which is to be compared with the inputted cooling water temperature, a reference value (third reference value) which is to be compared with the inputted ISG entry frequency, a reference value (fourth reference value) which is to be compared with the inputted accumulated charge amount, and a reference value (fifth reference value) which is to be compared with the inputted starting number. Here, the first to fifth reference values may be respectively updated.

When the inputted starting voltage, the inputted cooling water temperature, and the inputted accumulated charge amount are larger than the corresponding reference values, that is, the first reference value, the second reference value, and the fourth reference value, respectively, and the inputted ISG entry frequency and the inputted starting number are smaller than the corresponding reference values, that is, the third reference value and the fifth reference value, respectively, engine control unit 32 performs the ISG operation.

Figure 2:
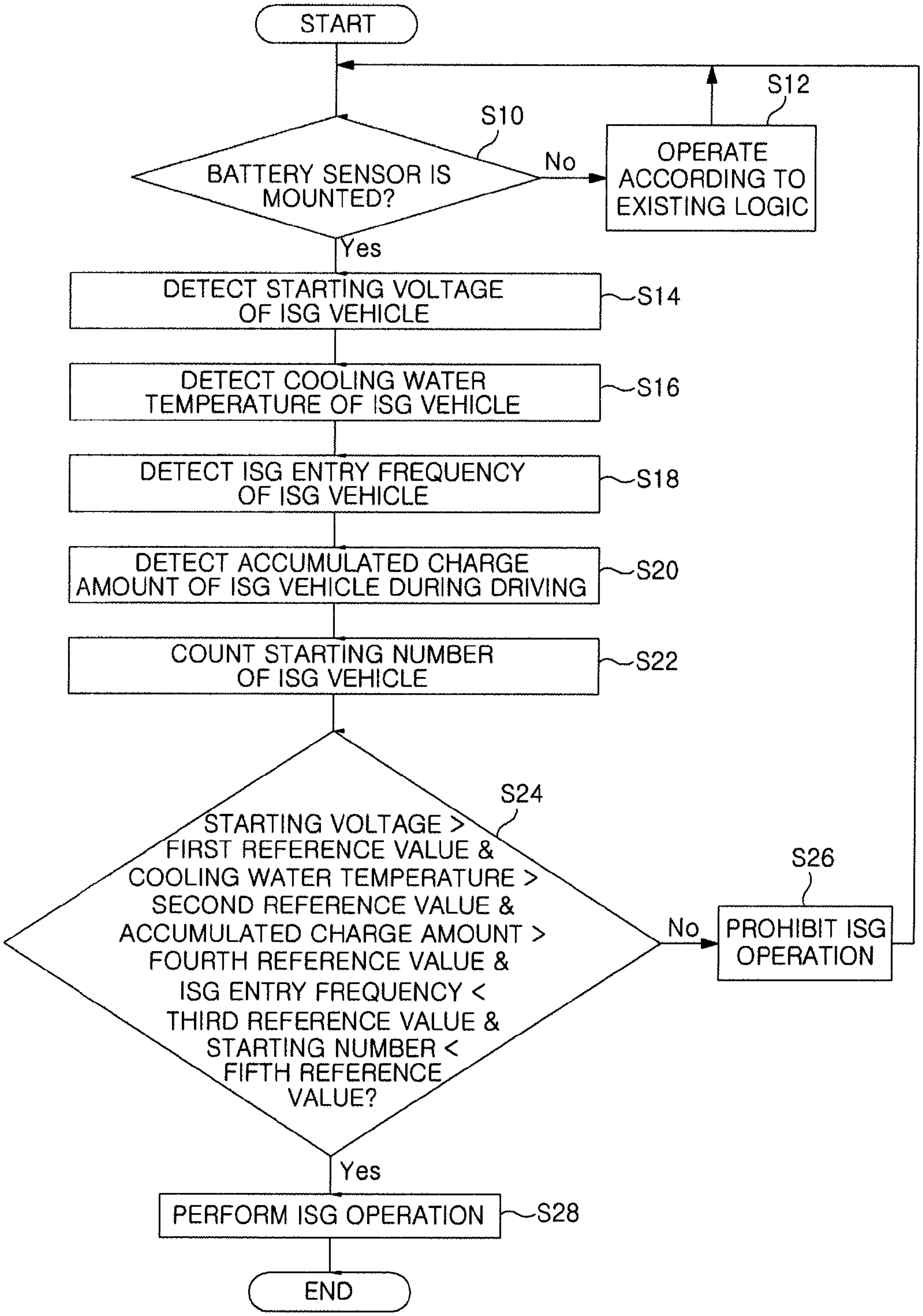
FIG. 2 is a flow chart explaining an exemplary ISG entry method according to the present invention.

Now, the operation of the ISG entry apparatus according to various embodiments of the present invention will be described with reference to a flow chart of FIG. 2.

First, engine control unit 32 determines whether a battery sensor is mounted or not (S10). Whether a battery sensor is mounted or not may be easily determined by installing a contact switch or the like at a portion where the battery sensor is mounted. Instead of the method using a contact switch, engine control unit 32 may determine whether a battery sensor is mounted or not, based on a signal depending on whether a battery sensor is mounted or not, when engine control unit 32 includes a system capable of receiving a signal from the battery sensor.

When it is determined that the battery sensor is mounted ("No" at the step S10), engine control unit 32 operates according to the existing logic (S12). In various embodiments, the descriptions will be focused on a case in which a battery sensor is not mounted.

When it is determined that a battery sensor is not mounted ("Yes" at the step S10), engine control unit 32 performs an ISG operation by using a variety of detection signals.

That is, starting voltage detection unit 22 detects a starting voltage of the ISG vehicle having no battery sensor mounted therein, for example, an output voltage of a generator (S14). Cooling water temperature detection unit 24 detects the cooling water temperature of engine 18 of the ISG vehicle having no battery sensor mounted thereon at step S16. ISG entry frequency detection unit 26 detects the ISG entry frequency of the ISG vehicle having no battery sensor mounted therein (S18). Accumulated charge amount detection unit 28 detects an accumulated charge amount of the ISG vehicle having no battery sensor mounted therein during driving (step 20) Starting number counting unit 30 counts the key starting number of the ISG vehicle having no battery sensor mounted therein (S22) Here, the sequence of the above-described steps S14 to S22 may be changed. In other words, as shown in FIG. 2, the ISG operation does not need to be performed according to the sequence of the starting voltage detection→the cooling water temperature detection→the ISG entry frequency detection→the accumulated charge amount detection→the starting number counting, but the sequence may be adjusted Subsequently, engine control unit 32 determines whether or not the inputted starting voltage, the inputted cooling water temperature, and the inputted accumulated charge amount are larger than the corresponding reference values, that is, the first reference value, the second reference value, and the fourth reference, respectively, and the inputted ISG entry frequency and the starting number are smaller than the corresponding reference values, that is, the third reference value and the fourth reference value (S24.)

When the determination condition is not satisfied ("No" at the step S24), engine control unit 32 prohibits the ISG operation (S26).

When the determination condition is satisfied ("Yes" at the step S24), engine control unit 32 performs the ISG operation at step (S28).

For convenience in explanation and accurate definition in the appended claims, the terms front and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An idle stop & go (ISG) entry apparatus comprising:

a starting voltage detection unit detecting a starting voltage of an ISG vehicle having no battery sensor mounted therein;

a cooling water temperature detection unit detecting a cooling water temperature of the ISG vehicle;

an ISG entry frequency detection unit detecting an ISG entry frequency of the ISG vehicle;

an accumulated charge amount detection unit detecting an accumulated charge amount of the ISG vehicle during driving;

a starting number counting unit counting the starting number of the ISG vehicle; and an engine control unit performing an ISG operation based on the starting voltage, the cooling water temperature, the ISG entry frequency, the accumulated charge amount, and the starting number.

2. The apparatus as defined in claim 1, wherein the engine control unit stores reference values which are to be compared with the starting voltage, the cooling water temperature, the ISG entry frequency, the accumulated charge amount, and the starting number, respectively.

3. The apparatus as defined in claim 2, wherein the respective reference values are updated.

4. The apparatus as defined in claim 2, wherein the engine control unit performs the ISG operation, when the starting voltage, the cooling water temperature, and the accumulated charge amount are larger than the corresponding reference values, respectively, and the ISG entry frequency and the starting number are smaller than the corresponding reference values, respectively.

5. An ISG entry method comprising:

detecting a starting voltage of an ISG vehicle having no battery sensor mounted therein;

detecting a cooling water temperature of the ISG vehicle;

detecting an ISG entry frequency of the ISG vehicle;

detecting an accumulated charge amount of the ISG vehicle during driving;

counting the starting number of the ISG vehicle; and performing an ISG operation based on the starting voltage, the cooling water temperature, the ISG entry frequency, the accumulated charge amount, and the starting number.

6. The method as defined in claim 5, wherein, in the performing of the ISG operation, reference values which are to be compared with the starting voltage, the cooling water temperature, the ISG entry frequency, the accumulated charge amount, and the starting number, respectively, are used to determine whether or not to perform the ISG operation, and the ISG operation is performed according to the determination result.

7. The method as defined in claim 6, wherein the respective reference values are updated.

8. The method as defined in claim 6, wherein, in the performing of the ISG operation, when the starting voltage, the cooling water temperature, and the accumulated charge amount are larger than the corresponding reference values, and the ISG entry frequency and the starting number are smaller than the corresponding reference values, the ISG operation is performed.

* * * * *